Figure 1:
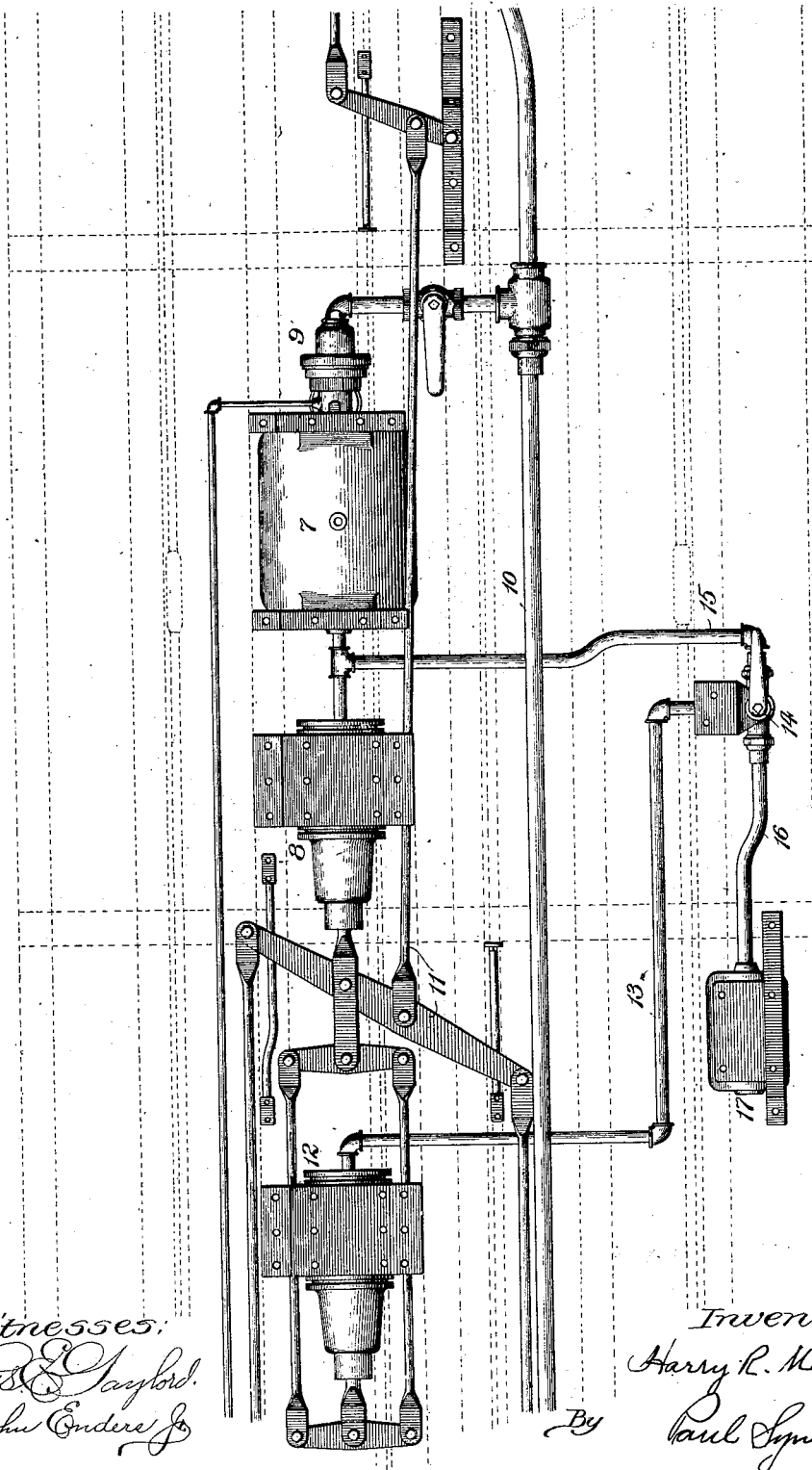

No. 749,075. PATENTED JAN. 5, 1904.
H. R. MASON.
LOAD BRAKE APPARATUS.
APPLICATION FILED MAY 19, 1902.
NO MODEL. 4 SHEETS—SHEET 3.

WITNESSES:
John Enders Jr.
Geo. C. Davison.

INVENTOR.
Harry R. Mason
BY Paul Synnestvedt
ATTORNEY.

No. 749,075. PATENTED JAN. 5, 1904.
H. R. MASON.
LOAD BRAKE APPARATUS.
APPLICATION FILED MAY 19, 1902.
NO MODEL. 4 SHEETS—SHEET 4.
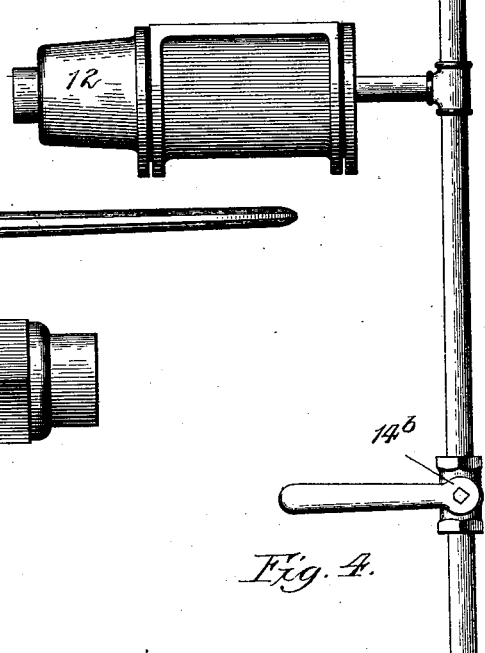
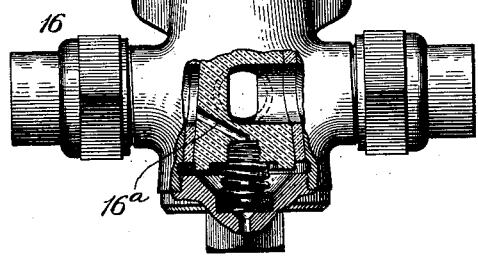
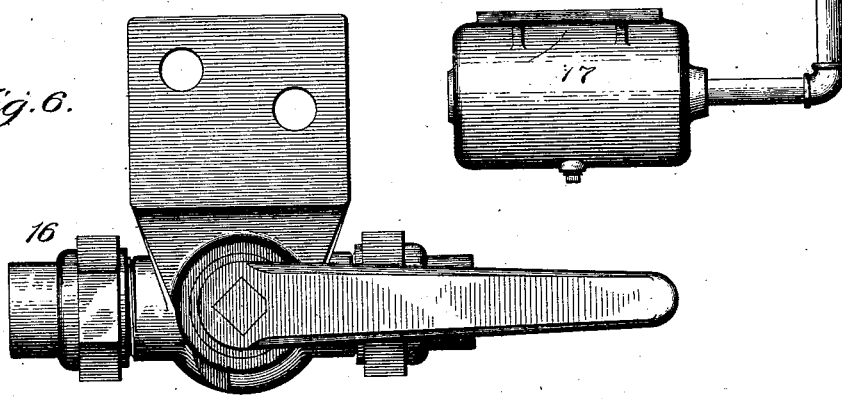
WITNESSES:
John Enders, Jr.
Geo. C. Davison.
INVENTOR.
Harry R. Mason
BY Paul Synnestvedt
ATTORNEY.

No. 749,075. Patented January 5, 1904.

UNITED STATES PATENT OFFICE.

HARRY R. MASON, OF CHICAGO, ILLINOIS, ASSIGNOR TO THE WESTINGHOUSE AIR BRAKE COMPANY, OF PITTSBURG, PENNSYLVANIA, A CORPORATION OF PENNSYLVANIA.

LOAD-BRAKE APPARATUS.

SPECIFICATION forming part of Letters Patent No. 749,075, dated January 5, 1904.

Application filed May 19, 1902. Serial No. 108,014. (No model.)

*To all whom it may concern:*

Be it known that I, HARRY R. MASON, a citizen of the United States of America, residing at Chicago, Cook county, Illinois, have invented certain new and useful Improvements in Load-Brake Apparatus, of which the following, taken in connection with the accompanying drawings, is a specification.

This invention has reference to the provisions of means for braking cars in a railroad-train in proportion to the load carried by the same, so that the empty car will not have the same amount of braking force as will be available when the car is loaded, and thus there will be no danger of sliding wheels on the empty cars, while at the same time provision will be made for suitable braking force on the cars which are loaded. Devices of this character have been heretofore proposed; but among other difficulties encountered in the operation of the same one which is especially to be mentioned is the interference with the normal operation of the brake caused by a throttling of one or more of the brake-passages or a change in the relative expansion of the pressures, whereby a different pressure result is secured, and consequently a different operation of the brakes, particularly in release. Thus, for example, it has been heretofore proposed to provide means whereby to shut off the opening from the triple valve to the brake-cylinder on a light car at a certain pressure, so that after such cut-off no further expansion of air from the auxiliary reservoir can take place on such light car, while when the car is loaded the full expansion from the reservoir is possible and a higher brake-cylinder pressure thereby attained. It is obvious to those familiar with the operation of the ordinary form of automatic air-brake—that is, the form employing the auxiliary reservoir, triple valve and cylinder under each car in combination with a constantly-stored train-pipe—that such operation makes a change in the equalized pressure for full application of the brakes as between light cars and loaded cars and that when the full application takes place the reservoir-pressure will be more reduced than when it does not take place and that thus under the latter condition the brake will require a higher pressure to release than will be required where full equalization has occurred. This makes the valves irregular in their release and interferes to a considerable extent with the operation of the apparatus with that nicety which is essential to the control of long trains.

The first of the objects of my present invention is to overcome the difficulties referred to, while yet providing apparatus capable of applying less braking force to a light car than to a loaded car and to overcome such difficulties without in any manner interfering with the normal operation of the automatic brake or triple valve.

A further object of my present invention is the construction of an apparatus of the kind specified comprising, in combination with a fluid-pressure reservoir and a cylinder, an expansion-chamber and means for throwing the expansion-chamber into and out of operation in order not to vary the pressure in the brake-cylinder.

The above, as well as such other objects as may hereinafter appear, I attain by means of a construction which I have illustrated in preferred form in the accompanying drawings, in which—

Figure 2:
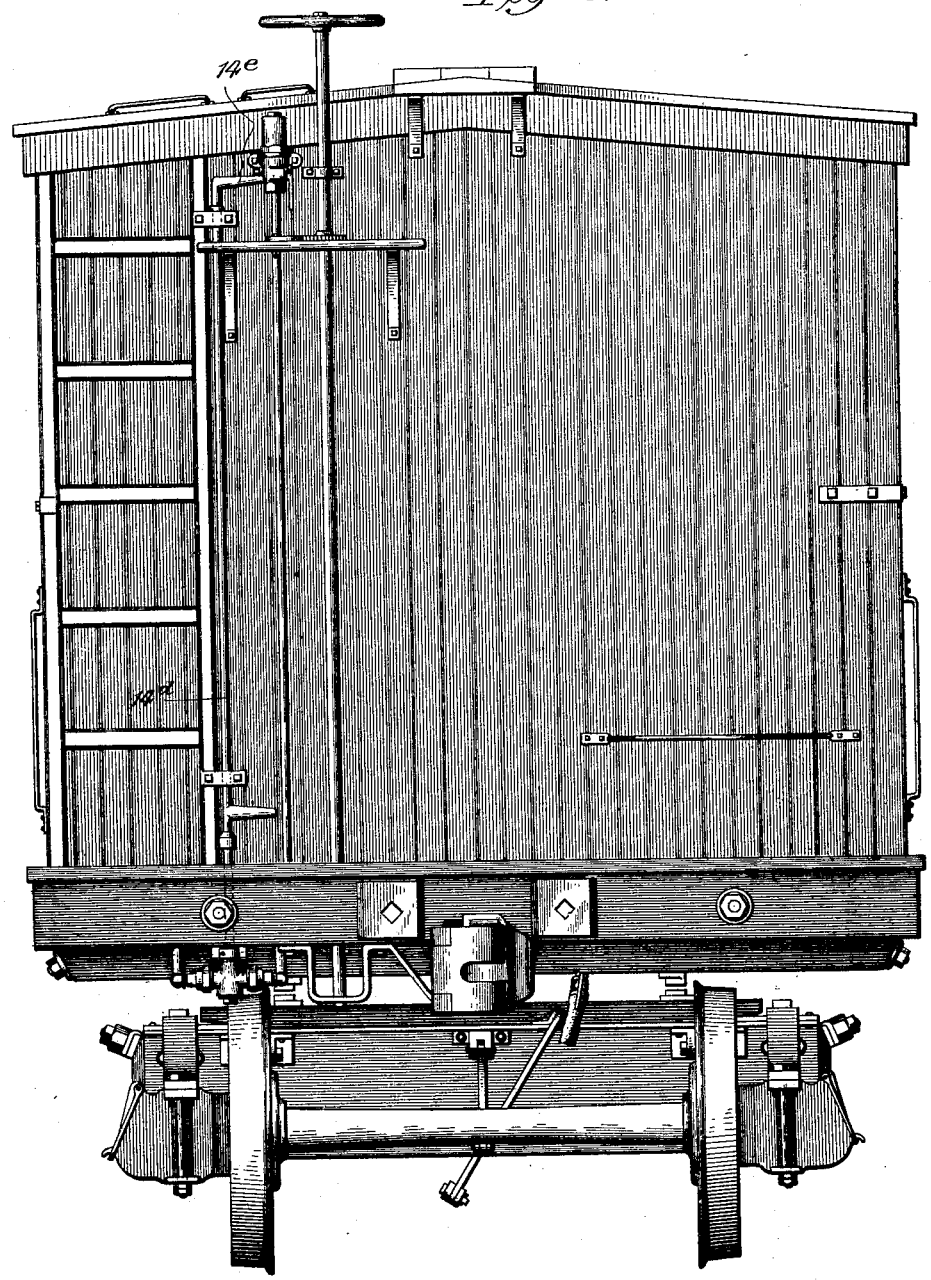
Figure 3:
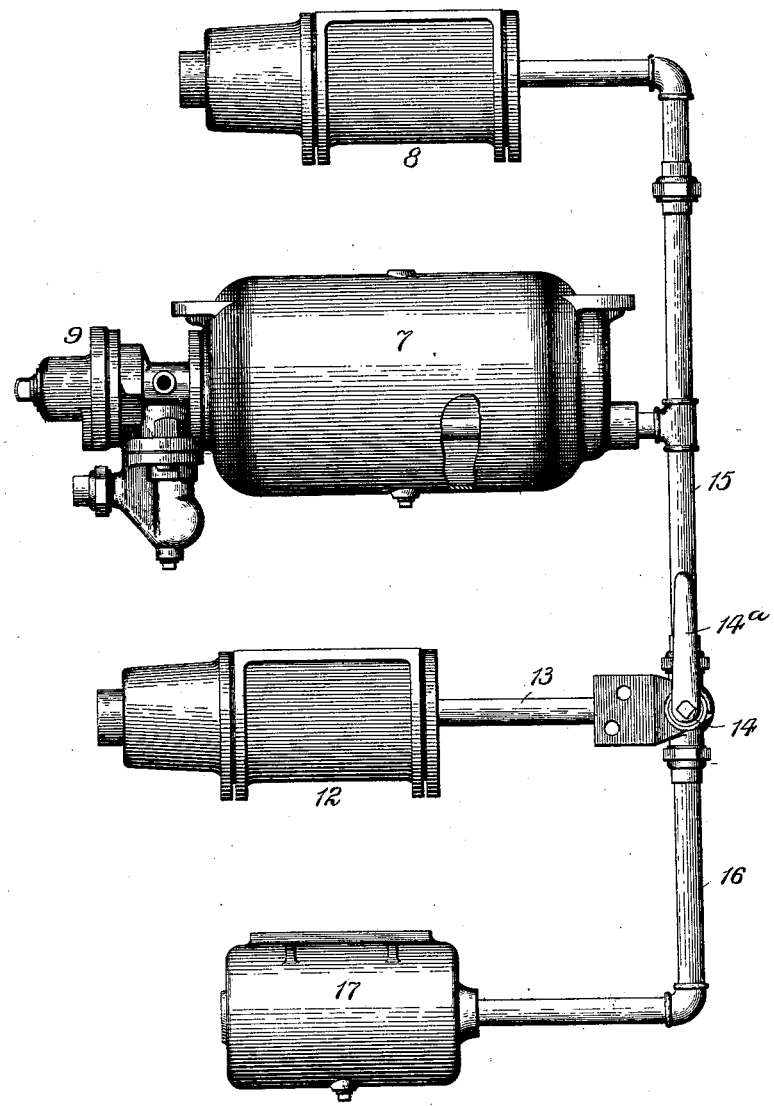

Figure 1 is a plan view of a part of a car inverted, showing my improvements applied thereto. Fig. 2 is an end view of the car. Fig. 3 is a view showing certain of the features of my improvements without the other parts of the car or brake mechanism. Fig. 4 is a view showing a modification of my invention. Fig. 5 is a view, partly in section, showing the improved form of valve which I employ as a means for throwing the expansion-chamber into and out of operation; and Fig. 6 is a plan view of said valve.

In carrying out my invention I provide the car first with the ordinary form of apparatus, using, however, a reservoir of larger size, the several parts comprising the usual brake equipment being indicated in Fig. 1, as 7 the auxiliary reservoir, 8 the brake-cylinder, 9 the triple valve, and 10 the train-pipe, the levers and rods being indicated by reference-numeral 11 and connected with the ordinary equipment in the usual manner. To some convenient part of the lever mechanism I connect a supplemental cylinder 12, provided with an inlet-pipe 13, which comes from a valve 14, that also has an opening into it from a pipe 15, communicating with the brake-cylinder, and from a pipe 16, which communicates with an expansion-chamber 17, which is, in effect, a dummy cylinder—that is, when in open communication with the pipe 15. It is practically an enlargement of the cylinder capacity of the ordinary cylinder 8, but having no piston or operative mechanism associated with it is what may be termed a "dummy" device. Another arrangement of these several parts is shown on Fig. 3, in which the reservoir 7 the cylinder 8, the supplemental cylinder 12, the expansion-chamber 17, the valve device 14, and the pipe connections 15 and 16 and 13 are numbered the same as in Fig. 1.

The operation of the parts shown in Fig. 3 is substantially as follows: Assuming the handle 14ª of the valve device 14 to be in a position in which communication is freely established between the pipes 13 and 15 and the pipe 16 cut off, it is obvious that when the brake is applied in the usual way the air coming from the triple valve 9 will pass through the pipes 15 and 13 into the supplemental cylinder 12, as well as to the regular cylinder 8, and the pressure therefore operates upon both cylinders 8 and 12 to produce an augmented braking power such as would be requisite for proper handling of the loaded car, the reservoir 7 being, as already stated, made of sufficient capacity to provide for such augmented braking power. With the apparatus in such condition the cylinders 8 and 12 act practically as a single cylinder, so far as the operation of the brake is concerned, and the equalized pressure when the full application is permitted will be the same on this car if the reservoir and the two cylinders are properly proportioned, as it is on the other cars of the train. If now when the car is light it be desired to cut off supplemental cylinder 12, thus to reduce the braking force and prevent danger of sliding the wheels, the handle 14ª of the valve 14 is turned so as to cut off the pipe 13 and open communication through the pipe 16 to the expansion-chamber 17, which then becomes a dummy cylinder and practically an enlargement of the cylinder 8 of the same approximate capacity as the supplemental cylinder 12, so that the pressure from the reservoir when the brake is applied will pass to the cylinder 8 and also to the expansion-chamber 17 and will on full application of the brakes reduce to the same point as it would reduce with the cylinders 8 and 12 in connection and the chamber 17 cut out. Thus when the expansion-chamber 17 is cut in and the cylinder 12 cut out the apparatus will operate at the same pressures and in all respects just like the apparatus did with both cylinders 8 and 12 in operation, and the pressure conditions will be just the same both as to application and release as they are in all of the other cars of the train, provided, of course, as stated, that the proportion between the reservoir 7 and the cylinders is made the same as it is in other cases. The capacity of the expansion-chamber 17 should be approximately the same as the cubical contents of the cylinder 12 when the brake is applied and the piston has an average travel.

Referring to Figs. 5 and 6, it will be seen that the valve 14, which I have shown in Figs. 1 and 3, is provided with a vent or release port 16ª, adapted when the handle is turned to cut off the pipe 16 to bleed any air that may be in the pipe 16 or expansion-chamber 17 into the atmosphere, so as to hold the expansion-chamber 17 vented at all times when it is not in use, and thus ready to act properly when it is again put into operation.

In Fig. 4 I have shown a construction in which the expansion-chamber 17 is provided with a plain form of cut-out cock 14ᵇ instead of being connected to a three-way cock, as in the case of Figs. 1 and 3, this suggested form in Fig. 4 being designed for use, for example, where a separate cut-out cock for the supplemental cylinder 12 might be employed.

While I have shown in Figs. 1 and 3 the handle of the valve which is the means for throwing the expansion-chamber into and out of operation as located under the car, it is obvious that this might be placed, as shown on Fig. 2, near one end of the car and a rod 14ᵈ run up from the same to a handle 14ᵉ near the pressure-retaining valve, so that it could be reached from the top of the car, and it would not be necessary for the brakeman to get down on the ground to change from one construction to another.

Having thus described my invention, what I claim as new, and desire to secure by Letters Patent, is—

1. A load-brake apparatus comprising the combination with a fluid-pressure reservoir and cylinder, of a passive expansion-chamber, and means for throwing said expansion-chamber into and out of operation.

2. A load-brake apparatus comprising the combination with a reservoir and cylinder, of a triple valve, an expansion-chamber, and supplemental cylinder, and means for throwing said expansion-chamber into and out of operation, substantially as described.

3. A load-brake apparatus comprising the combination with a fluid-pressure reservoir and cylinder, of an expansion-chamber, means for throwing said expansion-chamber into and out of operation, said means being provided with means for bleeding said chamber when said valve is closed, substantially as described.

4. A load-brake apparatus comprising the combination with a fluid-pressure reservoir, cylinder, and triple valve, of a supplemental cylinder, an expansion-chamber, and a valve for throwing said expansion-chamber into and out of operation, alternately with said supplemental cylinder, substantially as described.

5. The combination with an auxiliary reservoir and brake-cylinder, of a supplementary brake-cylinder and an expansion-chamber, and means for alternately making communication between the reservoir and the supplementary cylinder or the expansion-chamber, for the purpose specified.

In testimony whereof I have hereunto set my hand in the presence of two subscribing witnesses.

HARRY R. MASON.

In presence of—
  LEWIS R. BLACKMAN,
  PAUL CARPENTER.